United States Patent Office.

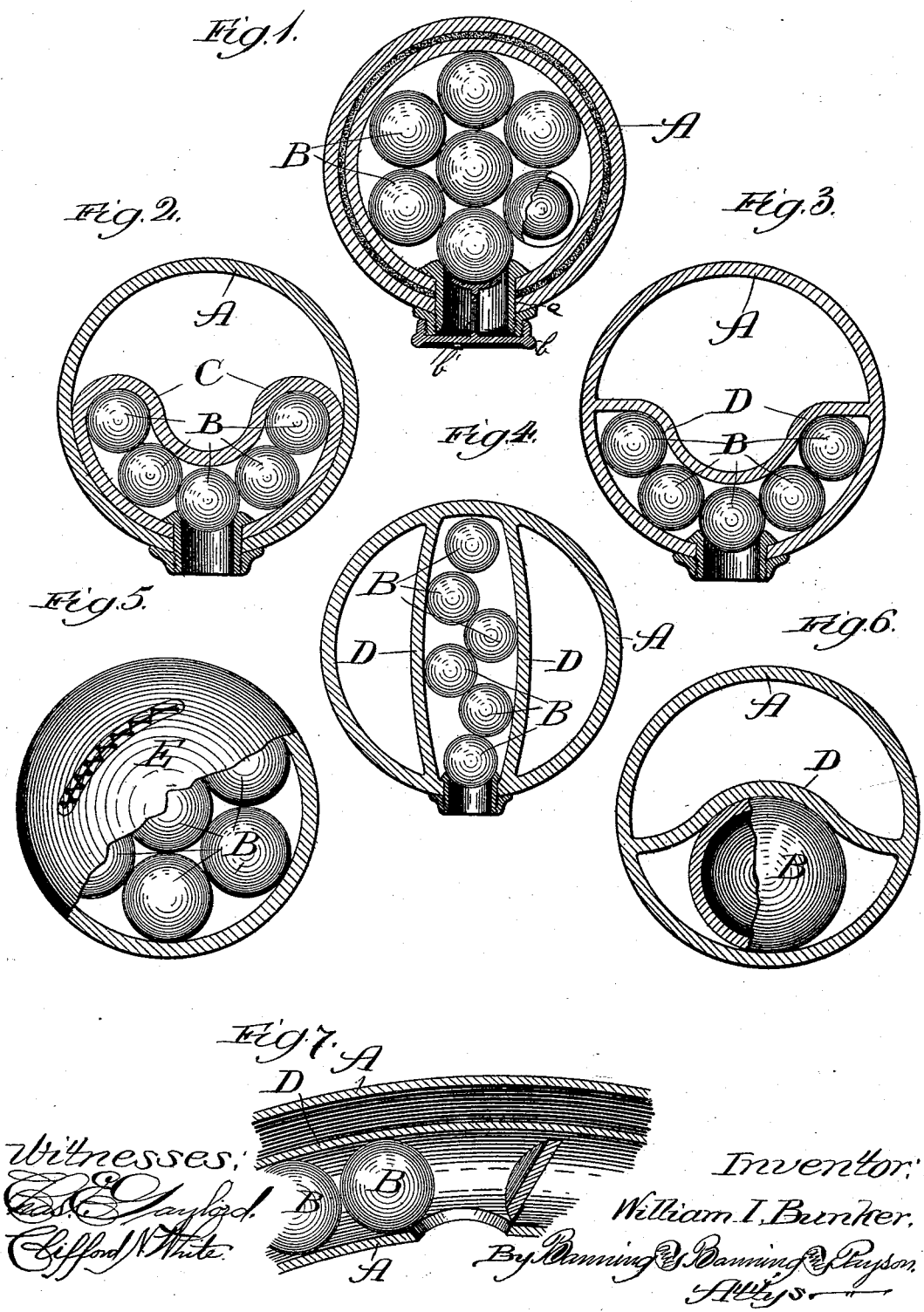

WILLIAM I. BUNKER, OF LA GRANGE, ILLINOIS.

VEHICLE-TIRE.

SPECIFICATION forming part of Letters Patent No. 488,061, dated December 13, 1892.

Application filed May 31, 1892. Serial No. 434,945. (No model.)

*To all whom it may concern:*

Be it known that I, WILLIAM I. BUNKER, residing at La Grange, Illinois, have invented certain new and useful Improvements in Vehicle-Tires, of which the following is a specification.

The object of my invention is to make a vehicle-tire especially adapted for bicycle-wheels, which shall be flexible, and yet held with sufficient tension by mechanical means introduced into the tire; and my invention consists in the features and details of construction hereinafter described and claimed.

In the drawings, Figure 1 is a transverse section of a bicycle-tire filled with elastic balls or cushions to secure the desired tension. Fig. 2 is a transverse section of a bicycle-tire containing an inner tube in which are placed elastic balls. Fig. 3 is a transverse section of a tire provided with a partition with balls on one side. Fig. 4 is a transverse section of a bicycle-tire with double partitions and with balls between them. Fig. 5 is a side elevation, partly in section, of a spherical cushion filled with balls. Fig. 6 is a transverse section of a bicycle-tube provided with a partition and large balls on one side, and Fig. 7 is a longitudinal section of a tube with a partition and balls on one side.

In making my improvement in vehicle-tires I take an endless tube, tire, or case A of the desired size and strength and fill it wholly or partially with elastic balls B, that will serve to give the proper expansion to the tube and impart to it the desired tension or resiliency. In some cases I fill the tire entirely with balls of a small size, so that a number of them will lie side by side in the cross-section of the tube, as shown in Fig. 1. In other cases I take a tire that is provided with an inner tube C, and, after inflating the space between the inner and the outer tubes with the desired quantity of air, introduce a number of elastic balls or cushions into the inner tube to press one side of it toward the air-filled space, thus subjecting the air to the desired amount of pressure to give a tire of the requisite tension, as shown in Fig. 2. In other cases I take a tire provided with a partition D in cross-section and fill the tube at one side of the partition with air and fill the tube at the other side of the partition with elastic balls, so as to press or crowd the partition toward the air-space, and in this way press the air out until the desired elasticity or tension in the tire has been obtained, as shown in Fig. 3. In other cases I take a tire provided with double partitions, with air-spaces between the partitions and the walls of the tube, into which air may be introduced in the desired quantity and the space between the partitions filled with elastic balls, as shown in Fig. 4. In other cases I make an elastic cushion E and fill it with as many balls as required to expand the inclosing case and give it the desired elasticity or tension, as shown in Fig. 5. In other cases I take a tire provided with a partition on one side of which the space may be filled with air and force in the required number of large-size balls to force out and expand the partition against the air to impart the desired tension and elasticity toward the tire, as shown in Figs. 6 and 7. In all these cases it will be seen that I make use of mechanical means for effecting the expansion of the tire or case to the desired dimensions to impart the desired elasticity to it, and that such mechanical means consist of separate elastic balls or cushions introduced into the interior of the tire by which the degree of tension or expansion of the tire may be increased, diminished, or modified at pleasure.

To insert the cushions under pressure, I introduce them through a tubular opening formed, preferably, by arranging a thimble $a$ in the side of the tube, which may be fastened to the tube in any desired way, and providing a cap $b$, adapted to fit over the end of the thimble and be fastened thereto. Extending up from the cap is a rod $b'$, preferably enlarged at its inner end to bear or act against the balls or cushions and force them in one after the other. When a sufficient number of balls have been introduced, the cap $b$ is fastened to the outer end of the thimble, with the rod $b'$ bearing against the last ball or cushion inserted to hold it in place and impart the desired pressure to the entire number of cushions within the flexible inclosing case.

What I regard as new, and desire to secure by Letters Patent, is—

1. The combination of a flexible inclosing case and separate elastic cushions therein of less diameter severally than the interior of the inclosing case and imparting the desired tension thereto by pressure against a resistant interposed between one side of each cushion and the side of the case, substantially as described.

2. The combination of a flexible inclosing case and separate elastic cushions therein of less diameter severally than the interior of the inclosing case and imparting the desired tension thereto by pressure against a resistant interposed between one side of each cushion and the side of the case, and means for inserting the cushion under pressure, substantially as described.

3. In a bicycle-tire, the combination of a flexible tube, a partition dividing the same into compartments, and elastic cushions filling one of the compartments and forcing the partition into the space of the other, substantially as described.

WILLIAM I. BUNKER.

Witnesses:
THOMAS A. BANNING,
EPHRAIM BANNING.